United States Patent
Matsuno et al.

(10) Patent No.: US 9,961,276 B2
(45) Date of Patent: May 1, 2018

(54) CAMERA APPARATUS AND IMAGE PROCESSING METHOD

(71) Applicant: NISSAN MOTOR CO., LTD., Yokohama-shi, Kanagawa (JP)

(72) Inventors: Yosuke Matsuno, Atsugi (JP); Hiroshi Satoh, Atsugi (JP); Hidekazu Nishiuchi, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 150 days.

(21) Appl. No.: 13/779,119

(22) Filed: Feb. 27, 2013

(65) Prior Publication Data

US 2013/0229526 A1    Sep. 5, 2013

(30) Foreign Application Priority Data

Mar. 1, 2012 (JP) ................................ 2012-045368
Feb. 15, 2013 (JP) ................................ 2013-027779

(51) Int. Cl.
H04N 5/33 (2006.01)
H04N 9/04 (2006.01)

(52) U.S. Cl.
CPC ............... *H04N 5/33* (2013.01); *H04N 5/332* (2013.01); *H04N 9/045* (2013.01)

(58) Field of Classification Search
CPC ........... H04N 5/332; H04N 5/33; H04N 9/045

(Continued)

(56) References Cited

U.S. PATENT DOCUMENTS 6,094,281 A * 7/2000 Nakai ...................... G07D 7/12
                                                         250/208.1
6,292,212 B1 * 9/2001 Zigadlo .................... H04N 5/33
                                                         250/338.1

(Continued)

FOREIGN PATENT DOCUMENTS

JP   2008-145386 A      6/2008
JP   2008287625 A   * 11/2008

(Continued)

OTHER PUBLICATIONS

USPTO Office Action, U.S. Appl. No. 13/779,147, dated Jan. 14, 2015, 10 pages.

(Continued)

*Primary Examiner* — Andy Rao
*Assistant Examiner* — Zaihan Jiang
(74) *Attorney, Agent, or Firm* — Foley & Lardner LLP

(57) ABSTRACT

An image taking unit takes an image by exposing three color light receivers and an invisible light receiver. The three color light receivers are sensitive to light in an invisible region emitted by an invisible light projector, and concurrently sensitive to the respective three primary colors of light. The invisible light receiver is sensitive to the light in the invisible region emitted by the invisible light projector. A marker pulse generator generates an exposure timing pulse for the image taking unit, and an emission timing pulse for the invisible light projector on the basis of a reference signal. A color image creator creates a color image from outputs from the respective color light receivers. A synchronous detection processor creates a detection image by performing a synchronous detection process on the outputs from the color light receivers and the invisible light receiver by use of the reference signal.

6 Claims, 7 Drawing Sheets

(58) Field of Classification Search
USPC .......................................................... 348/164
See application file for complete search history.

(56) References Cited

U.S. PATENT DOCUMENTS

| | | | |
|---|---|---|---|
| 7,463,772 B1* | 12/2008 | Lefevere et al. | ............. 382/215 |
| 2005/0007487 A1 | 1/2005 | Miyoshi et al. | |
| 2006/0100642 A1* | 5/2006 | Yang et al. | ................... 606/130 |
| 2006/0188849 A1* | 8/2006 | Shamaie | ......................... 434/85 |
| 2006/0289760 A1* | 12/2006 | Bathiche | ........................ 250/332 |
| 2007/0205355 A1* | 9/2007 | Kikuchi | ............. H04N 1/02865 |
| | | | 250/208.1 |
| 2008/0316434 A1* | 12/2008 | Hung et al. | ...................... 353/37 |
| 2009/0019188 A1* | 1/2009 | Mattice et al. | ................. 710/17 |
| 2010/0303344 A1 | 12/2010 | Sato et al. | |
| 2011/0124410 A1* | 5/2011 | Mao et al. | ....................... 463/31 |
| 2012/0212582 A1* | 8/2012 | Deutsch | ........................ 348/46 |
| 2012/0274745 A1* | 11/2012 | Russell | ............................ 348/46 |
| 2013/0002882 A1 | 1/2013 | Onozawa et al. | |
| 2013/0113956 A1* | 5/2013 | Anderson | ............... G06F 3/017 |
| | | | 348/223.1 |
| 2013/0135081 A1* | 5/2013 | McCloskey | .............. G07D 7/12 |
| | | | 340/5.8 |
| 2013/0176396 A1* | 7/2013 | Cohen | ................. H01L 27/1461 |
| | | | 348/46 |
| 2014/0009611 A1* | 1/2014 | Hiebl | ........................ F41G 1/36 |
| | | | 348/143 |

FOREIGN PATENT DOCUMENTS

| | | |
|---|---|---|
| JP | 2009-41928 A | 2/2009 |
| JP | 2011-233983 A | 11/2011 |
| JP | 2011-243862 A | 12/2011 |

OTHER PUBLICATIONS

U.S. Appl. No. 13/779,147, filed Feb. 27, 2013, Matsuno et al.
USPTO Office Action, U.S. Appl. No. 13/779,147, dated Sep. 24, 2014, 12 pages.
USPTO Office Action, U.S. Appl. No. 13/779,147, dated Apr. 8, 2015, 12 pages.
USPTO Notice of Allowance, U.S. Appl. No. 13/779,147, dated Jul. 31, 2015, 8 pages.

* cited by examiner

| R+IR | G+IR | R+IR | G+IR |
|------|------|------|------|
| IR   | B+IR | IR   | B+IR |
| R+IR | G+IR | R+IR | G+IR |
| IR   | B+IR | IR   | B+IR |

CAMERA APPARATUS AND IMAGE PROCESSING METHOD

BACKGROUND OF THE INVENTION

Field of the Invention

The present invention relates to a camera apparatus and an image processing method of creating a color image and a detection image based on emitted light.

Description of the Related Art

Japanese Patent Application Publication No. 2008-145386 (Patent Document 1) proposes an image taking apparatus for outputting a color image and a range image based on emitted infrared light by use of a single image taking unit. According to Patent Document 1, the image taking unit includes pixels each provided with a red (R) filter, a green (G) filter, a blue (B) filter, a filter IR1 and a filter IR2, where the filters IR1, IR2 pass mutually different frequency bands in the infrared region. The image taking apparatus proposed by Patent Document 1 generates the range image by: making a light projector emit light in a wavelength region transmittable through the filter IR2; comparing the amount of light received by the pixels of the filters IR1 with the amount of light received by the pixels of the filters IR2; and extracting the components of the emitted light. The pixels sensitive to the three primary colors of light are used to create the color image.

SUMMARY OF THE INVENTION

As described, the technique described in Patent Document 1 uses the pixels sensitive to the three primary colors of light only to create the color image, and uses the pixels sensitive to infrared light only to create the range image. This makes the range image lower in resolutions than the color image.

In light of the foregoing problem, an object of the present invention is to provide a camera apparatus and an image processing method which are capable of creating a high-resolution color image and a high-resolution detection image.

For the purpose of achieving the foregoing object, a first aspect of the present invention is summarized as a camera apparatus including an invisible light projector, color light receivers, an invisible light receiver, an image taking unit, a marker pulse generator, a color image creator and a synchronous detection processor. The image taking unit includes: three color light receivers sensitive to light in the invisible region emitted by the invisible light projector, and concurrently sensitive to the respective three primary colors of light; and an invisible light receiver sensitive to the light in the invisible region emitted by the invisible light projector. The marker pulse generator generates an exposure timing pulse for the image taking unit, and an emission timing pulse for the invisible light projector, on the basis of a reference signal expressed with a periodic function. The color image creator creates a color image from outputs from the respective color light receivers. The synchronous detection processor creates a detection image by performing a synchronous detection process on the outputs from the color light receivers and the invisible light receiver by use of the reference signal.

DESCRIPTION OF THE EMBODIMENT

Figure 1:
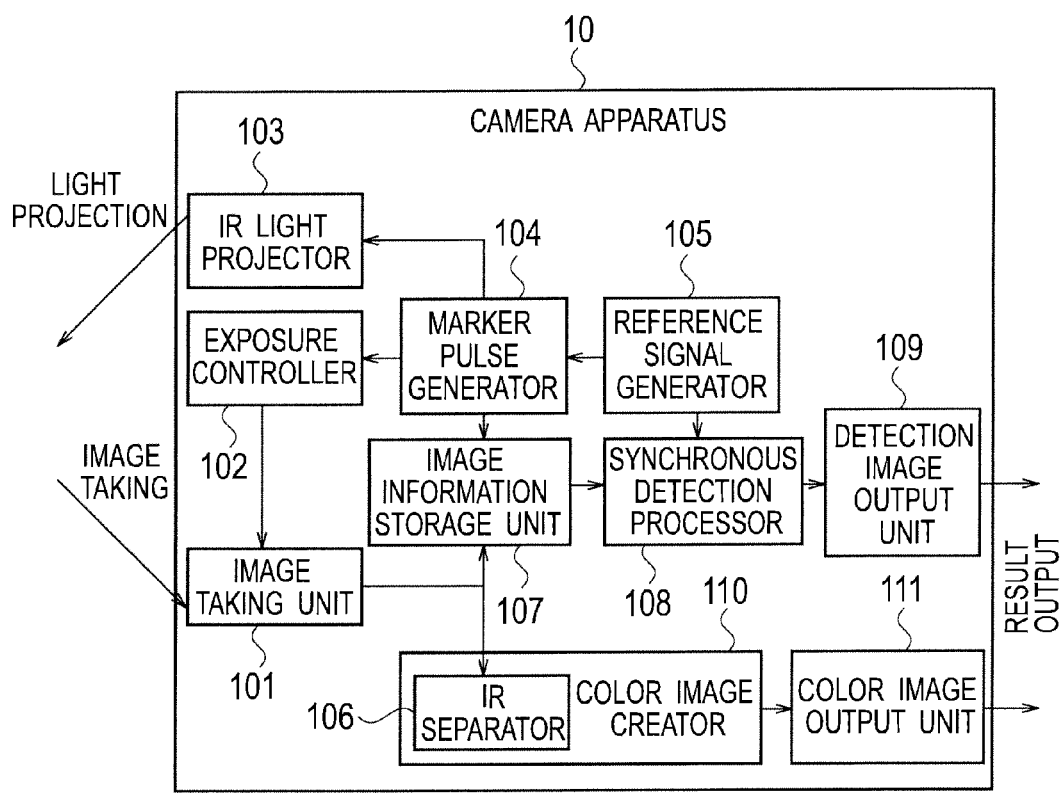
FIG. 1 is a block diagram for explaining a basic configuration of a camera apparatus of an embodiment of the present invention.

Next, descriptions will be provided on an embodiment of the present invention by referring to the drawings. The embodiment given below aims at showing examples of an apparatus and a method in which the technical ideas of the present invention are embodied. The technical ideas of the present invention are not limited to the apparatus or method exemplified in the following embodiment. Various changes can be made to the technical ideas of the present invention within the technical scope as recited in the scope of claims.

[Camera Apparatus]

As shown in FIG. 1, a camera apparatus of the embodiment of the present invention includes: an image taking unit 101 configured to take an image; an exposure controller 102 configured to control the exposure of the image taking unit 101; an invisible light projector (an IR light projector) 103 configured to emit the light in the invisible region, such as infrared light (IR light); a marker pulse generator 104; a reference signal generator 105; an image information storage unit 107; a synchronous detection processor 108; a detection image output unit 109; a color image creator 110 including an invisible light separator (an IR separator) 106; and a color image output unit 111.

Figure 2:
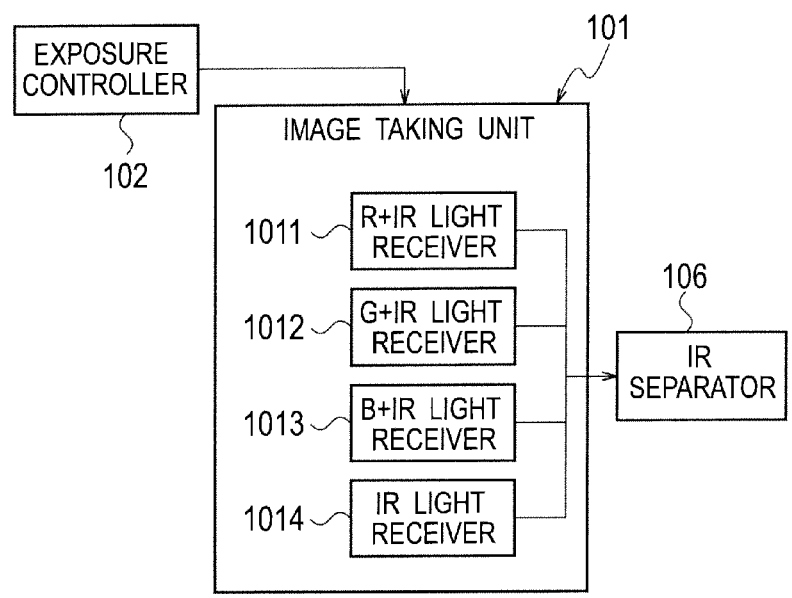
FIG. 2 is a block diagram for explaining an image taking unit included in the camera apparatus of the embodiment of the present invention.
Figure 3:
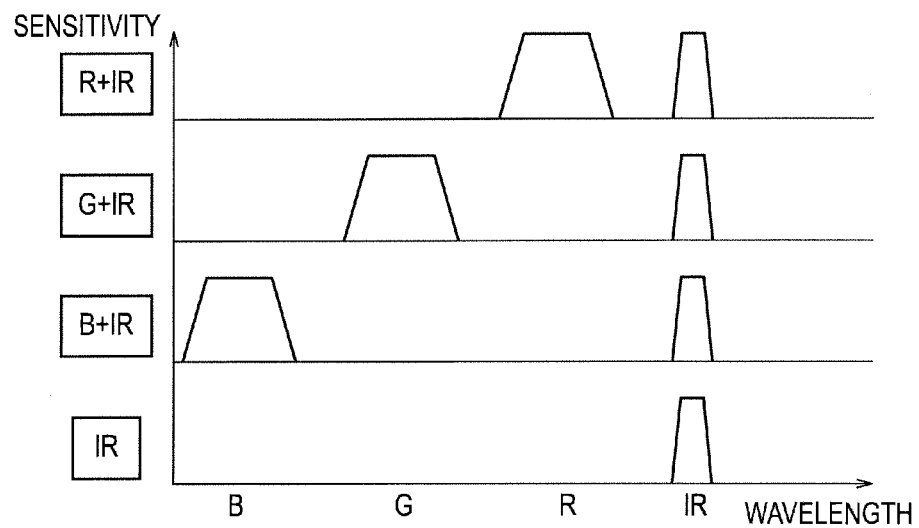
FIG. 3 is a diagram for explaining how sensitive each light receiver of the image taking unit included in the camera apparatus of the embodiment of the present invention is.

As shown in FIG. 2, the image taking unit 101 includes R+IR light receivers 1011, G+IR light receivers 1012, B+IR light receivers 1013, and IR light receivers 1014. The image taking unit 101 includes an image sensor such as a CCD image sensor or a CMOS image sensor. As shown in FIG. 3, the R+IR light receivers 1011 are sensitive to the wavelength range of red light (R light) and the wavelength range of IR light. Similarly, the G+IR light receivers 1012 are sensitive to the wavelength of green light (G light) and the wavelength of IR light. The B+IR light receivers 1013 are sensitive to the wavelength range of blue light (B light) and the wavelength range of IR light. The IR light receivers 1014 are sensitive to only the wavelength range of IR light.

Figures 4, 5:
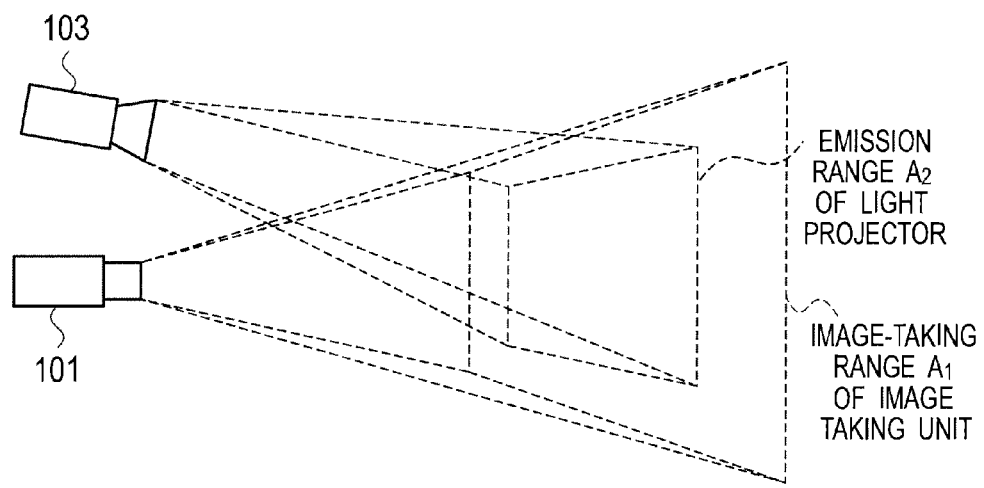
FIG. 4 is a diagram for explaining color filters of the image taking unit included in the camera apparatus of the embodiment of the present invention.
FIG. 5 is a diagram for explaining the image taking range of the image taking unit and the emission range of a light projector in the camera apparatus of the embodiment of the present invention.

The R+IR light receivers 1011, the G+IR light receivers 1012, the B+IR light receivers 1013 and the IR light receivers 1014 include color filters which are arrayed correspondingly to multiple receiving optics of the image sensor, respectively. As shown in FIG. 4, the R+IR light receivers 1011 include the color filters which transmit R light and IR light; the G+IR light receivers 1012 include the color filters which transmit G light and IR light; the B+IR light receivers 1013 include the color filters which transmit B light and IR light; and the IR light receivers 1014 include the color filters which transmit IR light.

As described above, the R+IR light receivers 1011, the G+IR light receivers 1012, the B+IR light receivers 1013 are color light receivers sensitive to: the light in the invisible region (IR light) emitted by the invisible light projector 103; and R light, G light and B light constituting the three primary colors (R, G, B) of light. The IR light receivers 1014 are invisible light receivers sensitive to the light in the invisible region (IR light) emitted by the invisible light projector 103. The image taking unit 101 takes an image by: driving an electronic shutter with timing controlled by the exposure controller 102; and performing exposure on the color light receivers and the invisible light receivers.

The invisible light projector 103 includes, for example, a light emitting diode (LED) and the like; and emits the light in the invisible region such as IR light. As shown in FIG. 5, the invisible light projector 103 is placed in a way that an emission area $A_2$ set by the invisible light projector 103 is included in an image taking range $A_1$ set by the image taking unit 101.

The reference signal generator 105 generates a reference signal for synchronous detection, which is expressed with a periodic function. The reference signal is expressed with sin ωF, for example. ω denotes the number of frames needed for the invisible light projector 103 to emit the light in one periodic cycle. F denotes the number of frames.

Figure 6:
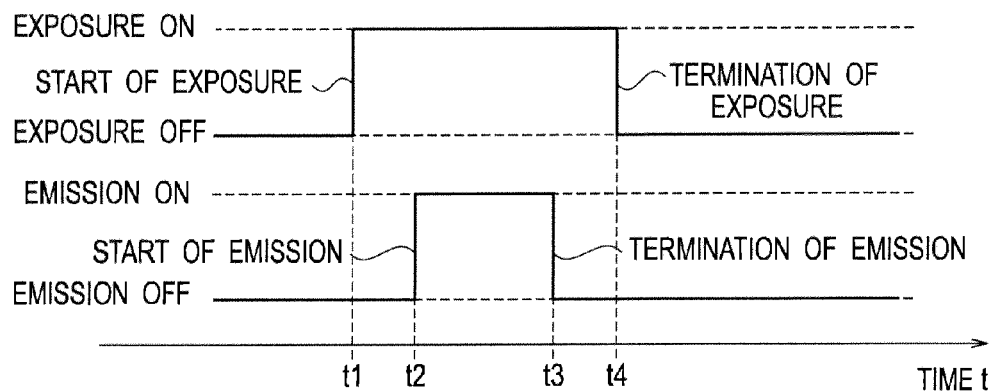
FIG. 6 is a timing chart for explaining exposure timing of the image taking unit and emission timing of the light projector in the camera apparatus of the embodiment of the present invention.

The marker pulse generator 104 generates an exposure timing pulse for the image taking unit 101, and an emission timing pulse for the invisible light projector 103, through pulse width modulation or the like on the basis of the reference signal generated by the reference signal generator 105. As shown in FIG. 6, in accordance with the timing pulses generated by the marker pulse generator 104, the invisible light projector 103 emits the light in a way that the length of time of emission from an emission starting time $t_2$ through an emission terminating time $t_3$ is included in the length of time of exposure from an exposure starting time $t_1$ through an exposure terminating time $t_4$ of the image taking unit 101.

Figure 7:
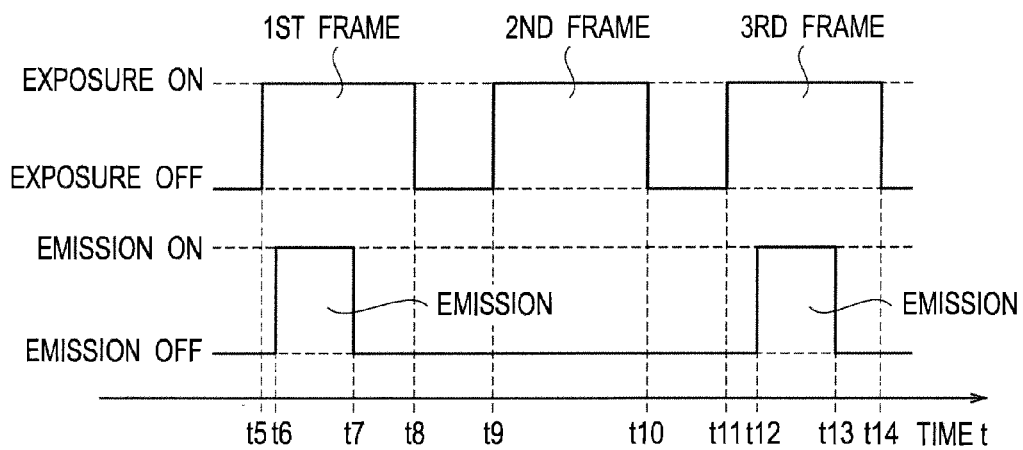
FIG. 7 is the other timing chart for explaining the exposure timing of the image taking unit and the emission timing of the light projector in the camera apparatus of the embodiment of the present invention.

The marker pulse generator 104 generates the emission timing pulse for the invisible light projector 103 in synchronism with the exposure timing pulse for the image taking unit 101 in a way that the length of time of emission of the invisible light projector 103 is included in the length of time of exposure of the image taking unit 101. In the case shown in FIG. 7, the invisible light projector 103 emits the light during a length of time of exposure in each odd frame after the image taking unit 101 starts to take an image, while the marker pulse generator 104 generates the emission timing pulse by: for each frame, judging whether or not the invisible light projector 103 should emit the light on the basis of the reference signal generated by the reference signal generator 105; and setting timing and strength of the emission.

The invisible light separator (IR separator) 106 separates wavelength components in the same region as those of the invisible light emitted by the invisible light projector 103 from information about the brightness of the image taken by the image taking unit 101. The wavelength in the same region as that of the invisible light does not have to be exactly the same wavelength as the invisible light, and suffices to be virtually the same as that of the invisible light.

In this respect, the brightness components of the three primary colors of light are denoted by R, G, B, while the brightness components of the light emitted by the invisible light projector 103 is denoted by $IR_r$. IR denotes brightness components of invisible light (IR light) from the outside including the sun. The outputs from each R+IR light receiver 1011, each G+IR light receiver 1012 and each B+IR light receiver 1013, which are the color light receivers, can be denoted by $(R+IR+IR_r)$, $(G+IR+IR_r)$ and $(B+IR+IR_r)$. The output from each IR light receiver 1014, which is the invisible light receiver, can be denoted by $(IR+IR_r)$.

The invisible light separator 106 subtracts the output from the IR light receiver 1014, which is the invisible light receiver, from the outputs from the R+IR light receiver 1011, the G+IR light receiver 1012 and the B+IR light receiver 1013, which are the color light receivers, as expressed with Equations (1) to (3). By this, the invisible light separator 106 is capable of separating the wavelength components of the invisible light emitted by the invisible light projector 103 from the information about the brightness of the image taken by the image taking unit 101.

$$(R+IR+IR_r)-(IR+IR_r)=R \qquad \text{Eq. (1)}$$

$$(G+IR+IR_r)-(IR+IR_r)=G \qquad \text{Eq. (2)}$$

$$(B+IR+IR_r)-(IR+IR_r)=B \qquad \text{Eq. (3)}$$

The color image creator 110 creates a color image by: removing the wavelength components of the invisible light, which is separated by the invisible light separator 106 from the image taken by the image taking unit 101; thereby acquiring the brightness components R, G, B of the three primary colors received by the R+IR light receiver 1011, the G+IR light receiver 1012 and the B+IR light receiver 1013 which are the color light receivers; and mapping the acquired brightness components R, G, B.

The color image output unit 111 converts the color image created by the color image creator 110 into an image in a predetermined format such as a format in compliance with the NTSC (National Television System Committee) standard or a format in compliance with the PAL (Phase Alternation by Line) standard, and outputs the resultant image to the outside.

The image information storage unit 107 receives, from the marker pulse generator 104, an emission flag indicating whether or not the frame is the one taken when the invisible light projector 103 emits the light, and information about the periodic cycle of the reference signal generated by the reference signal generator 105 when the frame is taken. The image information storage unit 107 stores the image (frame) taken by the image taking unit 101, the emission flag, and the information about the periodic cycle in this order as image information for each frame.

The synchronous detection processor 108 creates a detection image by: retrieving the images which are taken by the image taking unit 101 and stored in the image information storage unit 107; and performing a synchronous detection process on the retrieved images by use of the reference signal generated by the reference signal generator 105. Once the image information storage unit 107 completes storing the images corresponding to one periodic cycle of the reference signal, the synchronous detection processor 108 retrieves the images corresponding to the one periodic cycle from the image information storage unit 107, and performs the synchronous detection process by multiplying all the pixels in each retrieved image by the reference signal which is generated when the image is taken. When the reference signal is expressed with sin ωt, the synchronous detection processor 108 extracts the brightness components $IR_r$ of the light, which is emitted by the invisible light projector 103, by performing the synchronous detection process as expressed with Equations (4) to (7). The synchronous detection processor 108 creates the detection image by mapping the extracted components of the invisible light emitted by the invisible light projector 103.

$$(R+IR+IR_r) \times \sin \Omega t = IR_r \qquad \text{Eq. (4)}$$

$$(G+IR+IR_r) \times \sin \omega t = IR_r \qquad \text{Eq. (5)}$$

$$(B+IR+IR_r) \times \sin \omega t = IR_r \qquad \text{Eq. (6)}$$

$$(IR+IR_r) \times \sin \omega t = IR_r \qquad \text{Eq. (7)}$$

The detection image output unit 109 converts the detection image created by the detection image processor 108 into an image in the predetermined format such as a format in compliance with the NTSC (National Television System Committee) standard or a format in compliance with the PAL (Phase Alternation by Line) standard, and outputs the resultant image.

Figure 8A:
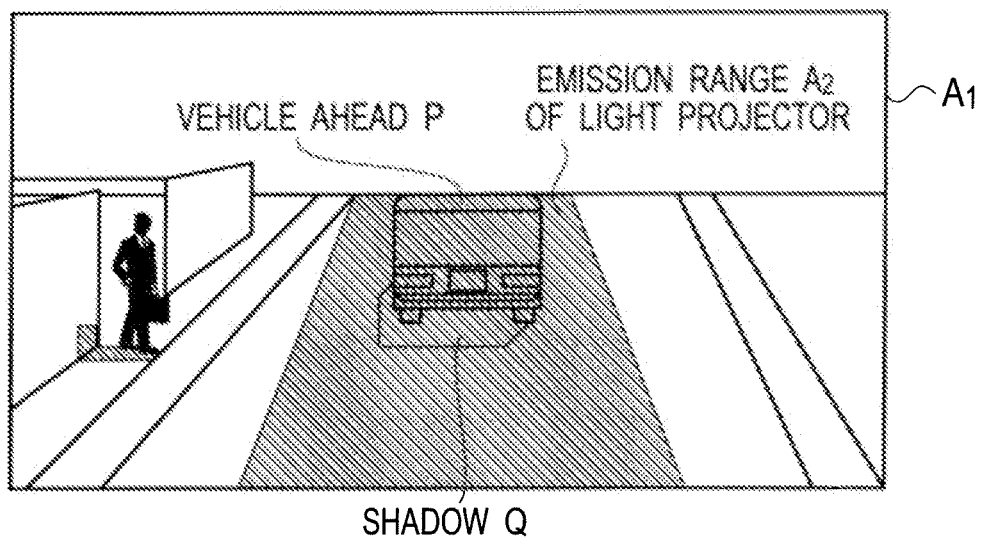
FIG. 8A shows an example of an image taken by the image taking unit of the camera apparatus of the embodiment of the present invention.
Figure 8B:
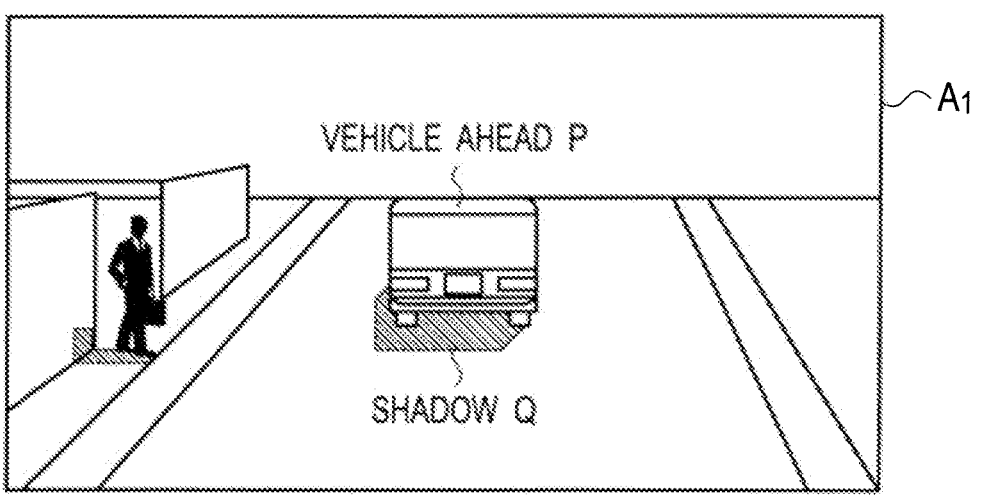
FIG. 8B shows an example of a color image created by the camera apparatus of the embodiment of the present invention.

As shown in FIG. 8A, an image which is taken by the image taking unit 101 when the invisible light projector 103 emits invisible light is formed from visible light and the invisible light. As shown in FIG. 8B, an image which is taken by the image taking unit 101 when the invisible light projector 103 emits no invisible light is formed from visible light. For this reason, when an image of the space in front of your vehicle is taken, the shadow Q of a vehicle P ahead in the sunlight is shown in FIG. 8A like in FIG. 8B, even though within the emission area A2 of the invisible light projector 103.

Figure 9:
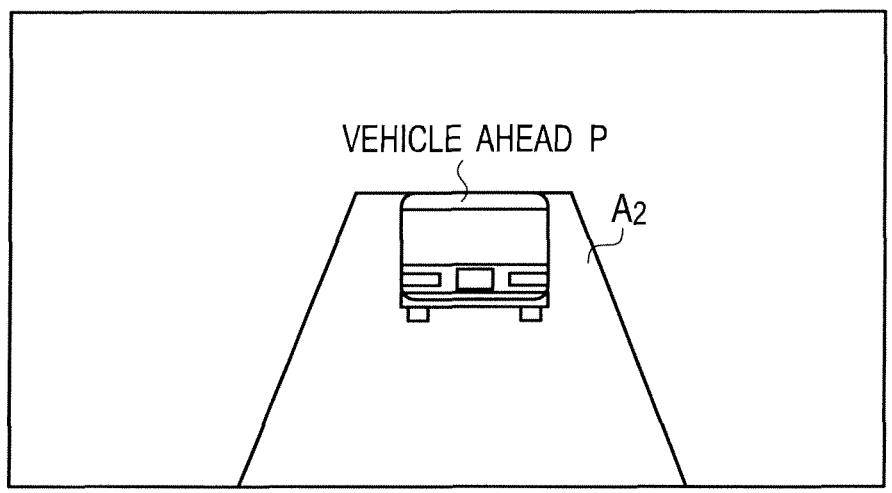
FIG. 9 shows an example of a synchronous detection image created by the camera apparatus of the embodiment of the present invention.

As shown in FIG. 9, the image outputted from the detection image output unit 109 represents the differential between the image shown in FIG. 8A and the image shown in FIG. 8B, and is accordingly formed from the invisible light emitted by the invisible light projector 103. For this reason, the image represents the emission area $A_2$ alone, and the shadow Q of the vehicle P ahead in the sunlight disappears from the image.

[Image Processing Method]

Figure 10:
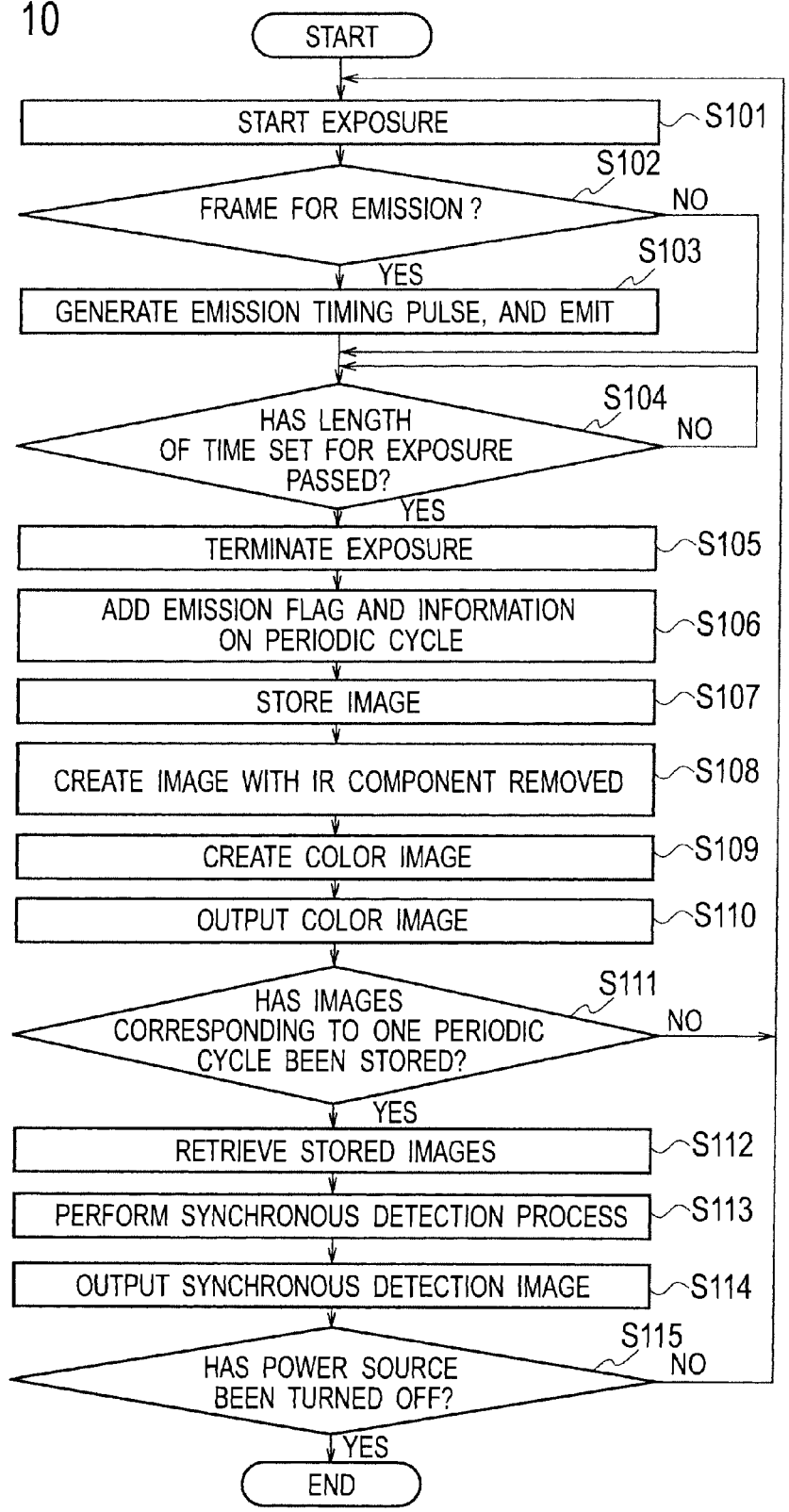
FIG. 10 is a flowchart for explaining an image processing method of the camera apparatus of the embodiment of the present invention.

Descriptions will be hereinbelow provided for an example of how the camera apparatus of the embodiment of the present invention works by use of a flowchart shown in FIG. 10.

First of all, in step S101, the marker pulse generator 104 generates the exposure timing pulse for the image taking unit 101 on the basis of the reference signal generated by the reference signal generator 105, and outputs the exposure timing pulse to the exposure controller 102. Under the control of the exposure controller 102, the image taking unit 101 exposes the R+IR light receiver 1011, the G+IR light receiver 1012, the B+IR light receiver 1013, and the IR light receiver 1014 to light.

Subsequently, in step S102, the marker pulse generator 104 judges whether or not the frame is that for which the invisible light projector 103 should emit the invisible light on the basis of the reference signal generated by the reference signal generator 105. If the marker pulse generator 104 judges that the frame is not that for which the invisible light projector 103 should emit the invisible light, the process proceeds to step S104.

If the marker pulse generator 104 judges in step S102 that the frame is one for the invisible light projector 103 to emit the invisible light, the marker pulse generator 104, in step S103, generates the emission timing pulse for the invisible light projector 103 on the basis of the reference signal generated by the reference signal generator 105. The invisible light projector 103 emits the invisible light in response to the emission timing pulse generated by the marker pulse generator 104.

In step S104, the exposure controller 102 judges whether or not the length of time set for the exposure has passed on the basis of the exposure timing pulse generated by the marker pulse generator 104. If the length of time of the exposure has not passed yet, the exposure controller 102 continues the exposure by the image taking unit 101. If the length of time of the exposure has passed, the exposure controller 102 terminates the exposure by the image taking unit 101 in step S105.

In step S106, the marker pulse generator 104 outputs to the image information storage unit 107 the emission flag indicating whether or not the frame is the one taken when the invisible light projector 103 emits the invisible light, and the information about the periodic cycle of the reference signal generated by the reference signal generator 105. For example, in a case where the frame taken through steps S101 to S105 has been subjected to the process in step S103, the marker pulse generator 104 sets the emission flag "ON." In a case where the frame taken through steps S101 to S105 has not been subjected to the process in step S103, the marker pulse generator 104 sets the emission flag "OFF."

In step S107, the image information storage unit 107 stores the frame taken through steps S101 to S105, as well as the emission flag and the information on the period cycle which are outputted from the marker pulse generator 104 in step S106, while making association among the frame, the emission flag and the information.

In step S108, the invisible light separator 106 separates the wavelength components in the same region as those of the invisible light emitted by the invisible light projector 103, from the information on the brightness of the frame taken through steps S101 to S105.

In step S109, the color image creator 110 creates the color image by: acquiring the brightness components of the three primary colors from the information on the brightness of the frame from which the wavelength components of the invisible light are separated in step S108; and mapping the brightness components. In step S110, the color image output unit 111 converts the color image created by the color image creator 110 into an image in the predetermined format, and outputs the resultant image to the outside.

In step S111, the synchronous detection processor 108 judges whether or not the image information storage unit 107 has completed storing the image information corresponding to one periodic cycle of the reference signal for each frame. If the image information storage unit 107 has not completed storing the image information corresponding to the one periodic cycle, the process returns to step S101. If the image information storage unit 107 has completed storing the image information corresponding to the one periodic cycle, the synchronous detection processor retrieves the image information corresponding to the one periodic cycle of the reference signal from the image information storage unit 107 in step S112.

In step S113, the synchronous detection processor 108 creates the detection image by performing the synchronous detection process by use of the retrieved image information and the reference signal generated by the reference signal generator 105. The synchronous detection processor 108 performs the synchronous detection process by multiplying all the pixels of each retrieved image by the reference signal which is generated when the image is taken, and thus extracts the brightness components $IR_r$ of the light emitted by the invisible light projector 103. The synchronous detection processor 108 creates the detection image by mapping the thus-extracted components of the invisible light emitted by the invisible light projector 103.

In step S114, the detection image output unit 109 converts the detection image created by the synchronous detection processor 108 into an image in the predetermined format, and outputs the resultant image.

In step S115, if the power source or the driving switch turns off, the process is terminated. If the drive continues, the process returns to step S101.

The camera apparatus 10 of the embodiment of the present invention is capable of creating the detection image with high accuracy since: all the light receivers (1011 to 1014) of the image taking unit 101 are sensitive to the light in the invisible region which is emitted by the invisible light projector 103; and the synchronous detection process is performed on the outputs from all the light receivers.

In addition, the camera apparatus 10 of the embodiment of the present invention is capable of creating the color image from which the wavelength components of the light in the invisible region are removed, since the output from the invisible light receiver (1014) is subtracted from the outputs from the color light receivers (1011 to 1013).

Other Embodiments

Although, as described above, the invention has been described on the basis of the foregoing embodiment, the description and drawings constituting part of this disclosure shall not be understood as limiting the present invention. Various alternative embodiments, examples and operation technologies will be clear to those skilled in the art from this disclosure.

The foregoing embodiment may include means for calculating the distance to the object from the brightness of the detection image created by the synchronous detection processor 108. This makes it possible for the user to learn the distance to the object and the position of the object on the image from the color image taken.

Furthermore, although the foregoing embodiment has been described citing the example in which the light emitted by the invisible light projector 103 is the infrared light, the invisible light projector 103 may be configured to emit any other light in the invisible region. In this case, the color light receivers and the invisible light receiver 1014 may be sensitive to the light emitted by the invisible light projector 103.

For example, in a case where the invisible light projector 103 emits near infrared light as the light in the invisible region, the invisible light separator 106 is capable of reducing a deterioration in the R light component in the subtraction process expressed with Equation (1) by decreasing the sensitivity (output) of the color light receivers and the invisible light receiver 1014 to the near infrared light component (corresponding to $IR+IR_r$). Similarly, in a case where the invisible light projector 103 emits near ultraviolet light as the light in the invisible region, the invisible light separator 106 is capable of reducing a deterioration in the B light component in the subtraction process expressed with Equation (1) by decreasing the sensitivity (output) of the color light receivers and the invisible light receiver 1014 to the near ultraviolet light component (corresponding to $IR+IR_r$). As described above, the color image creator 110 is capable of reducing a deterioration in the image quality of the color image in the subtraction process expressed with Equation (1).

It is a matter of course that the present invention includes various embodiments and the like which have not been described herein. For this reason, the technical scope of the present invention shall be determined on the basis of only the matters to define the invention recited in the scope of claims which are considered appropriate from the foregoing descriptions.

The entire contents of Japanese Patent Applications No. 2012-045368 (filed on Mar. 1, 2012) and No. 2013-027779 (filed on Feb. 15, 2013) are incorporated herein by reference.

What is claimed is:

1. A camera apparatus comprising:
   an invisible light projector configured to emit light in an invisible region;
   three color light receivers sensitive to the light in the invisible region emitted by the invisible light projector, and each of the three color light receivers also being sensitive to a respective one of three primary colors of light;
   an invisible light receiver sensitive to the light in the invisible region emitted by the invisible light projector;
   an image sensor configured to take an image by exposing the color light receivers and the invisible light receiver;
   a marker pulse generating circuitry configured to generate an exposure timing pulse for the image sensor based on a reference signal, and an emission timing pulse for the invisible light projector based on the exposure timing pulse for the image sensor;
   a synchronous detection processor configured to create a detection image by performing a synchronous detection process on outputs from the color light receivers and the invisible light receiver by use of the reference signal; and
   a color image creating circuitry configured to create a color image from the outputs of the respective color light receivers used for creating the detection image, wherein
   the three color light receivers include a first pixel sensitive to the light in the invisible region emitted by the invisible light projector and a red primary color of light, a second pixel sensitive to the light in the invisible region emitted by the invisible light projector and a green primary color of light, and a third pixel sensitive to the light in the invisible region emitted by the invisible light projector and a blue primary color of light,
   the invisible light receiver includes a fourth pixel sensitive to the light in the invisible region emitted by the invisible light projector, and
   the synchronous detection processor creates the detection image on the basis of the light in the invisible region and the light in the respective one of three primary colors received at the same time by the color light receivers and the invisible light receiver,
   wherein a cycle of the exposure timing pulse is shorter than a cycle of the emission timing pulse.

2. The camera apparatus of claim 1, wherein the color image creating circuitry creates the color image by subtracting the output from the fourth pixel from the outputs from the first pixel, the second pixel and the third pixel.

3. The camera apparatus of claim 1, further comprising:
a color image outputting circuitry configured to output the color image created by the color image creating circuitry; and
a detection image outputting circuitry configured to output the detection image created by the synchronous detection processor.

4. The camera apparatus of claim 2, further comprising:
a color image outputting circuitry configured to output the color image created by the color image creating circuitry; and
a detection image outputting circuitry configured to output the detection image created by the synchronous detection processor.

5. An image processing method comprising:
emitting light in an invisible region;
taking an image by exposing three color light receivers and an invisible light receiver, each of the three color light receivers being sensitive to the light in the invisible region and also sensitive to a respective one of three primary colors of light, and the invisible light receiver being sensitive to the light in the invisible region;
generating a timing pulse for the exposure based on a reference signal, and a timing pulse for the emission of the light in the invisible region based on the timing pulse for the exposure;
creating a detection image by performing a synchronous detection process on outputs from the color light receivers and the invisible light receiver by use of the reference signal; and
creating a color image from the outputs from the respective color light receivers used for creating the detection image, wherein
the three color light receivers include a first pixel sensitive to emitted light in the invisible region and a red primary color of light, a second pixel sensitive to emitted light in the invisible region and a green primary color of light; a third pixel sensitive to emitted light in the invisible region and a blue primary color of light,
the invisible light receiver includes a fourth pixel sensitive to emitted light in the invisible region, and
the detection image is created on the basis of the light in the invisible region and the light in the respective one of three primary colors received at the same time by the color light receivers and the invisible light receiver,
wherein a cycle of the timing pulse for the exposure is shorter than a cycle of the timing pulse for the emission.

6. A camera apparatus comprising:
an invisible light projecting means for emitting light in an invisible region;
three color light receivers sensitive to the light in the invisible region emitted by the invisible light projecting means, and each of the three color light receivers also being sensitive to a respective one of three primary colors of light;
an invisible light receiver sensitive to the light in the invisible region emitted by the invisible light projecting means;
an image taking means for taking an image by exposing the color light receivers and the invisible light receiver;
a marker pulse generating means for generating an exposure timing pulse for the image taking means based on a reference signal, and an emission timing pulse for the invisible light projecting means based on the exposure timing pulse for the image taking means;
a synchronous detection processing means for creating a detection image by performing a synchronous detection process on outputs from the color light receivers and the invisible light receiver by use of the reference signal; and
a color image creating means for creating a color image from the outputs from the respective color light receivers used for creating the detection image, wherein
the three color light receivers include a first pixel sensitive to the light in the invisible region emitted by the invisible light projecting means and a red primary color of light; a second pixel sensitive to the light in the invisible region emitted by the invisible light projecting means and a green primary color of light; and a third pixel sensitive to the light in the invisible region emitted by the invisible light projecting means and a blue primary color of light,
the invisible light receiver includes a fourth pixel sensitive to the light in the invisible region emitted by the invisible light projecting means, and
the synchronous detection processing means creates the detection image on the basis of the light in the invisible region and the light in the respective one of three primary colors received at the same time by the color light receivers and the invisible light receiver,
wherein a cycle of the exposure timing pulse is shorter than a cycle of the emission timing pulse.

* * * * *